Aug. 16, 1932.   A. R. LEWELLEN   1,871,802
HEAT INDICATOR
Filed July 10, 1930
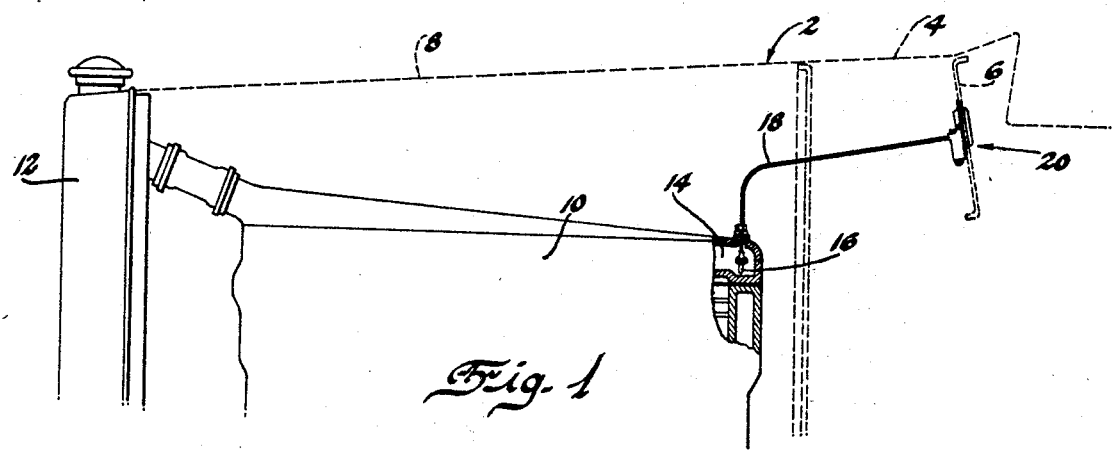
Fig. 1
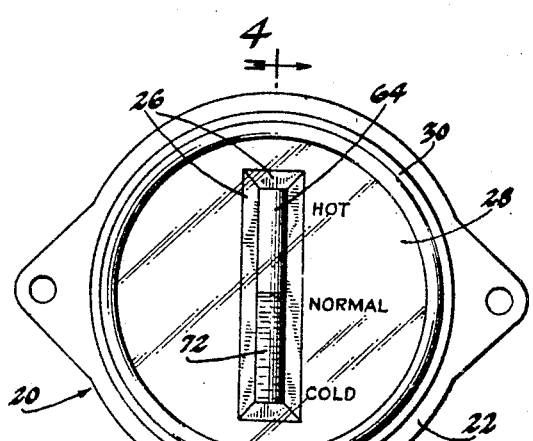
Fig. 2
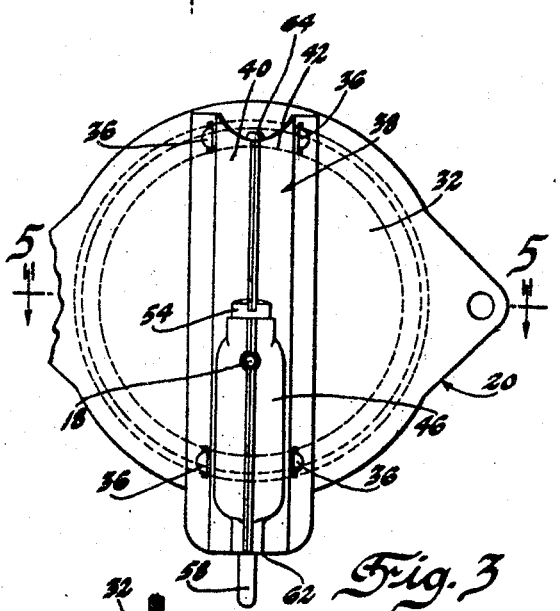
Fig. 3
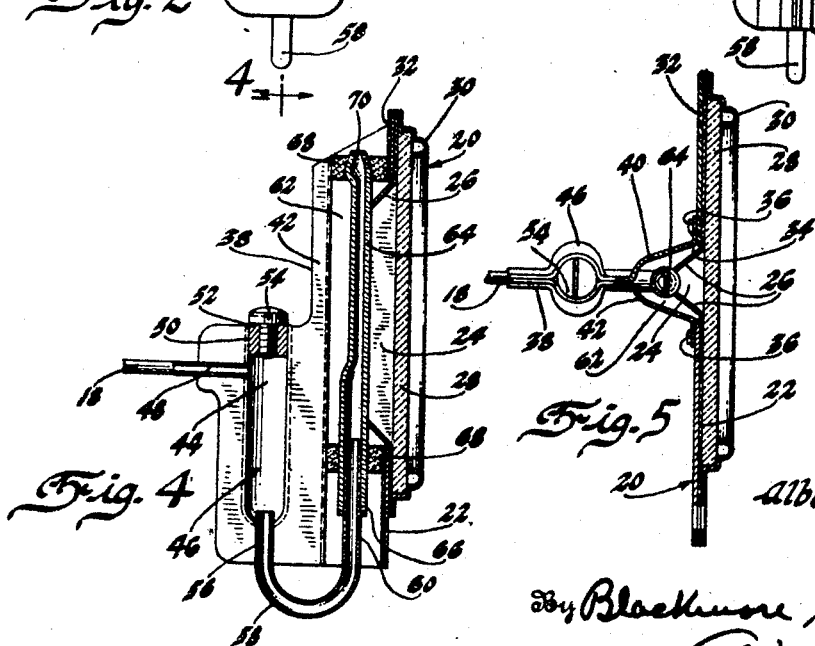
Fig. 4
Fig. 5
Inventor
Albert R. Lewellen
By Blackmore Sewer & Flint
Attorneys Patented Aug. 16, 1932

1,871,802

UNITED STATES PATENT OFFICE

ALBERT R. LEWELLEN, OF DETROIT, MICHIGAN, ASSIGNOR TO GENERAL MOTORS CORPORATION, OF DETROIT, MICHIGAN, A CORPORATION OF DELAWARE

HEAT INDICATOR

Application filed July 10, 1930. Serial No. 467,040.

This invention relates to heat indicators and has particular reference to heat indicators applied to the internal combustion engine of an automotive vehicle.

The particular novelty of the invention resides in a bracket which is attached to the gage at the instrument board and which forms a part of the gage per se.

The bracket of the invention is composed of two stamped halves which fit together or mate and are sweated to securely unite them to form the bracket. In stamping the two halves, provision is made for a chamber adapted to receive the fluid of the indiactor. Provision is also made for a channel portion in which there is received the glass column for indicating a change in the height of the indicating fluid. The chamber and channel portion of the bracket are united by means of a metallic U-tube which transmits the liquid from the chamber to the glass column. The glass column is held in place by means of a plurality of fabric packings positioned within the channel and held in place by means of a backing plate to which the bracket is attached. The chamber of the bracket is closed at its top by means of a plug soldered or sweated into place into which there is screwed a machine screw. A suitable opening at the upper portion of the chamber receives the tube which communicates with a bulb in the engine block.

On the drawing:

Figure 1 shows a view of so much of an automotive vehicle and its engine as is necessary to illustrate the application of the invention, parts being broken away and shown in section.

Figure 2 is a front view of the gage.

Figure 3 is a rear view of the structure of Figure 2.

Figure 4 is a section on the line 4—4 of Figure 2.

Figure 5 is a section on the line 5—5 of Figure 3.

Referring to the drawing, the numeral 2 indicates an automotive vehicle as a whole. The vehicle includes the cowl 4, instrument board 6 and hood 8. Under the hood, there is mounted the usual engine 10 having the radiator 12 and the water circulating system 14. Mounted in the water circulating system is a bulb 16 which is filled with air. Secured to the bulb is the metallic pipe 18 which is likewise filled with air and is preferably provided with an armor and extends to the instrument board 6 where it is connected to the gage 20. The installation of the parts so far described is conventional.

The particular novelty of the present invention resides in the gage 20. The gage has the front plate 22 provided with an opening 24 at its center formed by inwardly pressing portions 26 of the metal of the facing plate. Over the plate 26 there is applied the usual glass 28 held in place by means of a bezel 30. A backing plate 32 having a central opening 34 conforming to the opening 24 in the facing plate 22 extends over the back of the facing plate and has secured thereto by means of the tongues 36, the bracket of the invention indicated as a whole at 38. The bracket comprises the two stamped halves 40 and 42 which are sweated together in their final form shown in Figures 3 and 5.

In forming each bracket half 40 or 42, there is formed therein the hemi-cylindrical portion 44, which portions mate in final assembly to form the chamber 46. The chamber has three openings, one at its side indicated at 48 to receive the pipe 18 from the bulb 16; a second or filling opening 50 at its top which is closed by means of a plug 52 sweated or soldered therein, which in turn has the machine screw 54 to tightly close a threaded opening in the plug; and a third opening 56 at the bottom of the chamber 46, the purpose of which is to receive one arm of a metallic U-tube 58, the other arm 60 of which extends into a channel portion 62 formed between two edges of the bracket 38 and the purpose of which is to receive the glass tube or column 64. The end 60 of the U-tube 58 extends into and is secured in liquid tight relation in the lower end 66 of the glass tube 64. The tube is held in place by means of the fabric washers 68 positioned at the top and bottom of the tube and tightly mounted in the channel 62 and held therein by the backing plate 32. The tube 64 has a small opening 70 to the atmosphere at its upper portion. The tube 64 is so positioned that it is immediately in the rear of the opening 24.

The facing plate 22 is provided with any suitable designations such as "hot", "normal" and "cold", shown in Figure 2 to indicate temperature. The air in the bulb 16 and tube 18 will expand with an increase in temperature and the pressure in the bulb and pipe 18 will force the fluid 72 to rise in the glass tube 64.

I claim:

1. In a temperature indicator, a bracket comprising a plurality of stamped mating members secured together in fluid tight relation, said members having a chamber for receiving a liquid and a channel formed therein, a glass column mounted in said channel, and means connecting said chamber and column to permit the flow of liquid therebetween.

2. In a temperature indicator, a bracket comprising two stampings mating with and secured to each other in liquid tight relation and forming a liquid receiving chamber and a channel therebetween, a glass tube open at both ends mounted in said channel, and a U-tube connecting said chamber and glass column to permit the flow of liquid therebetween.

3. In a temperature indicator, a plurality of stampings secured together in fluid tight relation to form a bracket, a plate to which said bracket is secured, said bracket having a chamber for receiving an indicating fluid and a channel formed therein, transparent means in said bracket to show changes in level of said liquid, resilient means between said plate and channel for mounting said transparent means, and means connecting said chamber and transparent means to permit the flow of fluid therebetween.

In testimony whereof I affix my signature.

ALBERT R. LEWELLEN.